(12) United States Patent
Markham et al.

(10) Patent No.: US 12,721,312 B2
(45) Date of Patent: Sep. 1, 2026

(54) ANIMAL GROOMING DEVICE WITH FEATURE FOR TOPICAL APPLICATION OF THERAPEUTIC MATERIAL

(71) Applicant: Bounce Enterprises LLC, Golden, CO (US)

(72) Inventors: Joseph P. Markham, Golden, CO (US); Robert Neal Williams, Torrance, CA (US)

(73) Assignee: Bounce Enterprises LLC, Golden, CO (US)

( * ) Notice: Subject to any disclaimer, the term of this patent is extended or adjusted under 35 U.S.C. 154(b) by 0 days.

(21) Appl. No.: 18/476,230

(22) Filed: Sep. 27, 2023

(65) Prior Publication Data

US 2025/0098635 A1 Mar. 27, 2025

(51) Int. Cl.
*A01K 13/00* (2006.01)

(52) U.S. Cl.
CPC .......... *A01K 13/002* (2013.01); *A01K 13/003* (2013.01)

(58) Field of Classification Search
CPC ..... A01K 13/00; A01K 13/002; A01K 13/003
See application file for complete search history.

(56) References Cited

U.S. PATENT DOCUMENTS 4,343,265 A * 8/1982 Belschner ............ A01K 13/002 119/633
4,970,990 A * 11/1990 Wilhelmi ............. A01K 13/002 119/633
4,995,344 A * 2/1991 Olson .................. A01K 13/002 119/603

(Continued)

FOREIGN PATENT DOCUMENTS

CA 2503178 A1 * 4/2006 ........... A01K 13/001
CN 204616707 U * 9/2015 ............ A01K 13/00

(Continued)

OTHER PUBLICATIONS

International Search Report and Written Opinion received in International application No. PCT/US24/45362, mailed on Oct. 22, 2024, 8 pages.

(Continued)

*Primary Examiner* — Monica L Perry
*Assistant Examiner* — Aaron M Rodziwicz
(74) *Attorney, Agent, or Firm* — Berg Hill Greenleaf Ruscitti LLP

(57) ABSTRACT

An animal grooming device includes a body, a plurality of grooming elements secured to the body, an upper peripheral rim extending around a periphery of the body, the upper peripheral rim and top side of the body forming a reservoir to hold therapeutic material therein. An applicator pad is placed within said reservoir to selectively control dispensing of the material through an exposed surface of the applicator pad. Another embodiment includes a plurality of passageways formed through the body in which the material is dispensed from the reservoir or applicator pad through the passageways to a bottom side of the body adjacent to the grooming elements. A method of delivering the therapeutic material by the grooming device is achieved by filling the reservoir and then applying the pressure to the applicator pad causing dispensing of the material onto the animal through the passageways.

23 Claims, 12 Drawing Sheets

(56) References Cited

U.S. PATENT DOCUMENTS

| | | | | |
|---|---|---|---|---|
| D326,562 | S * | 6/1992 | Bertwell | D30/158 |
| D850,799 | S * | 6/2019 | Johnson | D30/158 |
| 10,334,994 | B1 * | 7/2019 | Burd | A47K 7/028 |
| 10,390,605 | B1 * | 8/2019 | Schechter | A01K 13/002 |
| 10,694,719 | B2 * | 6/2020 | Johnson | A01K 13/001 |
| D898,376 | S * | 10/2020 | Johnson | D4/134 |
| D903,955 | S * | 12/2020 | Singer | D30/159 |
| 2001/0037772 | A1 * | 11/2001 | Huddleston | A01K 13/002 15/151 |
| 2007/0144451 | A1 * | 6/2007 | Hurwitz | A01K 13/003 119/603 |
| 2013/0008388 | A1 * | 1/2013 | Chancy | A01K 13/003 119/604 |
| 2013/0284111 | A1 * | 10/2013 | Simon | A45D 24/30 119/677 |
| 2015/0000609 | A1 * | 1/2015 | Frye | A01K 13/001 119/625 |
| 2016/0262346 | A1 * | 9/2016 | Rifkin | A01K 15/02 |
| 2017/0049076 | A1 * | 2/2017 | Takla | A46B 11/0062 |
| 2018/0110202 | A1 * | 4/2018 | Michael | A01K 13/002 |
| 2018/0132452 | A1 * | 5/2018 | Dionne | A46B 9/023 |
| 2018/0368363 | A1 * | 12/2018 | Johnson | A01K 13/002 |
| 2019/0141949 | A1 * | 5/2019 | Alva | A01K 13/001 119/602 |
| 2022/0361447 | A1 * | 11/2022 | Mahtani | A46B 15/0081 |

FOREIGN PATENT DOCUMENTS

| | | | | |
|---|---|---|---|---|
| GB | 2510146 | A * | 7/2014 | A01K 13/00 |
| GB | 2569033 | A * | 6/2019 | A01K 13/00 |
| WO | WO-9515679 | A1 * | 6/1995 | A01K 13/002 |
| WO | WO-2006079817 | A1 * | 8/2006 | A01K 13/002 |
| WO | WO-2009149569 | A1 * | 12/2009 | A01K 13/002 |
| WO | WO-2021060733 | A1 * | 4/2021 | A01K 13/001 |

OTHER PUBLICATIONS

International Preliminary Report on Patentability received in International application No. PCT/US24/45362, mailed on Mar. 31, 2026, 6 pages.

* cited by examiner 10
12
14
18
20
22
24
30

12
22
62
16
26
62
26
48
60
62
30
26
26
40
62
30
48
26
16
26
22

ANIMAL GROOMING DEVICE WITH FEATURE FOR TOPICAL APPLICATION OF THERAPEUTIC MATERIAL

FIELD OF THE INVENTION

The invention generally relates to combs or brushes for animals, and more particularly, to a pet or animal grooming device that can selectively deliver therapeutic material at the same time the grooming device is used to groom or clean the animal.

BACKGROUND OF THE INVENTION

Brushes and combs for animals are often similar to brushes and combs for humans A standard comb or brush typically has a shaft or body and a plurality of teeth that extend linearly along the length of the body. A handle is connected to the body. Combs have teeth that are commonly of the same size, shape and spacing from one another. A standard brush includes a plurality of bristles made of a flexible material and mounted to the body of the brush. Brushes and combs are usually designed for single purpose use. Grooming kits may include various types of brushes and combs in order to provide a user with functional use options for grooming.

Some dog breeds have short hair of uniform length and texture, while other dog breeds may have longer hair and two coats with differing textures and lengths. Some dogs have an undercoat of soft fine fur and an overcoat of longer, stiffer fur. As one can appreciate, having the capability to address grooming requirements for a multitude of different types of animal coats can require a relatively large number of grooming utensils which is one reason why grooming kits are sold.

One aspect of grooming may also comprise washing of the animal. There are specific animal shampoos and conditioners sold for pets like dogs and cats. The application of shampoo onto an animal is typically achieved by the owner's hands or by use of a washcloth. The same is true for application of a conditioner; working the conditioner into the animals fur is typically done by hand or by a washcloth.

Over time, the type and number of products for grooming animals has greatly increased. The expansion of grooming products is consistent with the expansion of health products made available for animals as well. A robust coat of fur is essential for the basic health maintenance of dogs and cats. While grooming an animal first by washing the animal and then combing or brushing the animal is the most common maintenance activity for animal fur, products have been introduced into the market to enhance traditional grooming. For example, grooming supplements search as coconut oil and oatmeal bath formulations are available for pets to help an animal maintain a robust coat of fur. Pheromone sprays are known to help reduce anxiety in an animal.

One problem associated with the use of supplements applied to an animal's skin and fur is that there is no reliable way of evenly distributing the supplements if the pet owner simply uses a common comb or brush. While the owner may attempt to evenly spray or otherwise pour the supplement onto the animal, the particular location where the supplement is initially applied will most likely have the greatest concentration of the supplement. Further, even if the owner is particularly diligent in attempting to evenly distribute the supplement onto the animal, it is still difficult to evenly and controllably apply the supplement in a known quantity to a desired area of the animal.

Considering the existing drawbacks with respect to having to use multiple grooming devices and the inability to controllably apply supplements, there is a need for a multipurpose grooming device that can not only facilitate the traditional grooming functions of shampooing and conditioner application but can also controllably deliver a supplement to the skin and fur of an animal.

Relative directional or geometric terms may be used herein to describe specific parts of the device of the invention. For example, the terms 'upper" and "lower", or "sides", or other terms may be used herein, but it shall be understood that these are only relative terms and are provided for convenience of understanding various preferred embodiments as they may be depicted in the figures. Therefore, the invention is not limited to any particular spatial or geometric orientation in relation to the relative terms used to describe the invention.

As set forth herein, the grooming device of the present invention provides many advantages over existing grooming devices, as one will appreciate from a review of the following description of the invention and accompanying drawings.

SUMMARY OF THE INVENTION

The invention is a grooming device that is especially adapted for grooming the fur of animals and to selectively and controllably deliver or apply a desired material onto an animal's skin and fur. According to one preferred embodiment, the grooming device comprises a body that is shaped to allow for gripping in the hand of a user. The body has a plurality of grooves or indentations that are formed on the outer side edge of the body. For example, according to one preferred embodiment, there are at least three indentations on opposite side edges of the body that are arranged to conveniently conform with the user's fingers on one side of the body of the device and the user's thumb on the other side of the body. Both ends of the body may further include a depression that can be used to receive one or more fingers or the thumb of a user such that the user is able to control the grooming device not only along the side edges of the body, but also at the ends of the body. In short, the grooves/indentations and depressions are intended to provide an ergonomic grooming device that is easily grasped and held by the user so that the grooming device can be moved in any desired direction. A lower surface of the grooming device includes a plurality of grooming elements. The grooming elements are preferably flexible and elastomeric so that not only can the grooming elements bend, but the grooming elements can also stretch and contract as the grooming elements contact an animal's fur. According to one aspect of an embodiment, it is desirable to have the grooming elements made of a material that has a specified durometer hardness range that facilitates an optimal or targeted grooming function. The grooming elements may have a truncated conical shape in which the larger end of the truncated cone is located and connects to the lower surface of the body.

The device according to the first embodiment further includes an opposite upper surface and an outwardly extending peripheral wall. The peripheral wall and the upper surface form a reservoir or enclosure that has multiple functions as described below. The peripheral wall can be considered an extension of the side surfaces such that the indentations are formed continuously along the side surfaces of the body.

According to another embodiment of the invention, an absorbent pad or applicator is provided that may be placed within the reservoir or enclosure of the body. The applicator may, for example, be made of a sponge-like material that is capable of holding an amount of a liquid such as shampoo or conditioner. The shape of the applicator may conform to the peripheral wall such that the applicator conveniently fits within the reservoir and does not significantly shift or move as pressure may be applied to the applicator by a user. Accordingly, the applicator may also have plurality of grooves and indentations which match those located on the peripheral wall.

According to one embodiment of the invention incorporating the applicator, the applicator may be made a single material. According to another embodiment, the applicator may be made of multiple layers of materials, for example, the applicator may be constructed of an absorbent sponge like material and the upper exposed surface of the applicator may include a second layer of a less porous material with a roughened texture that can be used for scrubbing.

According to a method of the invention, liquids placed within the reservoir can be used to selectively deliver therapeutic materials to the skin and fur of an animal. The materials can include shampoo, conditioner, medications, pheromones, and other materials that might be beneficial if applied to the animal.

In use, the user applies a desired amount of the therapeutic material to the applicator or may fill the reservoir with the material. The user grasps the device with the applicator placed in the reservoir and the therapeutic material is then selectively applied to the animal by contact of the upper exposed surface of the applicator against the fur of the animal. The device at various times may be turned over and the user conducts a brushing motion so that the grooming elements contact the fur and help the material to penetrate the fur of the animal and/or to massage the skin of the animal. The applicator is capable of holding an amount of therapeutic material such that repeated contact of the applicator can be made at different parts along the animal's fur.

One should be able to appreciate that the device of the invention provides multiple functions in that the opposite sides of the device have respective functions and a user therefore does not have to separately pour or spray material onto the animal. With respect to the embodiment of the applicator that may have the second layer of material, this layer can be used to help scrub the skin of the animal or to otherwise apply additional frictional force to portions of the animal. For example, it may be necessary to more vigorously scrub the legs and feet of an animal in which case the second layer of the applicator becomes an ideal solution because a separate device is not required.

According to another preferred embodiment of the device of the invention, A second applicator may be provided that is secured to the surface of the device having the grooming elements. The second applicator has a plurality of holes that match the size and configuration of the grooming elements. The second applicator can be secured to the device by aligning the holes of the second applicator with the bristles and then pushing the applicator against the lower surface of the body. The holes are sized such that the grooming elements can frictionally engage the applicator to thereby hold the second applicator in place when in use. Like the first applicator, the second applicator may be made of a porous material and may have one or more layers. The second applicator can therefore be used to selectively apply therapeutic material to the skin and fur of the animal.

The first and second applicators can be used separately or simultaneously. Depending upon the particular grooming activity being conducted, it may be advantageous to have different therapeutic materials retained by the respective applicators.

According to another embodiment of the invention, it may include a plurality of passageways or openings that are formed through the body of the device. These passageways or openings therefore allow the therapeutic material to be applied to the skin and fur of the animal along the lower surface of the device while the first applicator remains in place. The user can selectively apply pressure to the first applicator in which the therapeutic material is dispensed from the first applicator and then flows through the passageways. The number and size of the passageways can be selected to control the rate at which the therapeutic material is allowed to be dispensed.

According to this last embodiment of the invention, it may further include a pressure applying implement that covers the upper exposed surface of the first applicator. The pressure applying implement is used to apply pressure onto the first applicator to thereby selectively meter an amount of the therapeutic material desired to be dispensed onto to the animal.

Based on the foregoing description of the grooming device, the invention according to one aspect may be considered an animal grooming device comprising: a body: a plurality of grooming elements secured to a bottom side the body, said grooming elements having substantially similar shapes and being spaced uniformly from one another along the bottom side; an upper peripheral rim extending around a periphery of a top side of the body, said upper peripheral rim extending above the top side; a plurality of indentations formed along an outer side edge of the body; at least one depression formed on an end of the body, and wherein said top side of the body and said upper peripheral rim form a reservoir for holding a quantity of material therein.

According to another aspect of the invention, it may be considered an animal grooming device comprising: a body; a plurality of grooming elements secured to a bottom side the body, said grooming elements having substantially similar shapes and being spaced uniformly from one another along the bottom side; an upper peripheral rim extending around a periphery of a top side of the body, said upper peripheral rim extending above the top side; said top side of the body and said upper peripheral rim forming a reservoir; a first applicator pad placed within said reservoir that holds a quantity of material therein; and wherein pressure applied to said body or said first applicator pad causes the material to be dispensed from the first applicator pad.

According to yet another aspect of the invention, it may be considered a method of delivering a therapeutic material by a grooming device to an animal, the method comprising: providing the grooming device having a body, a plurality of grooming elements secured to a bottom side of the body, an upper peripheral rim extending around a periphery of a top side of the body, said upper peripheral rim extending above the top side; said top side of the body and said upper peripheral rim forming a reservoir; placing a first applicator pad within said reservoir that holds a quantity of the therapeutic material therein, and applying pressure to said body or said first applicator pad causing the material to be dispensed from the first applicator pad.

Other features and advantages of the invention will become apparent by a review of the following detailed description and drawings.

DETAILED DESCRIPTION OF THE INVENTION

Figure 1:
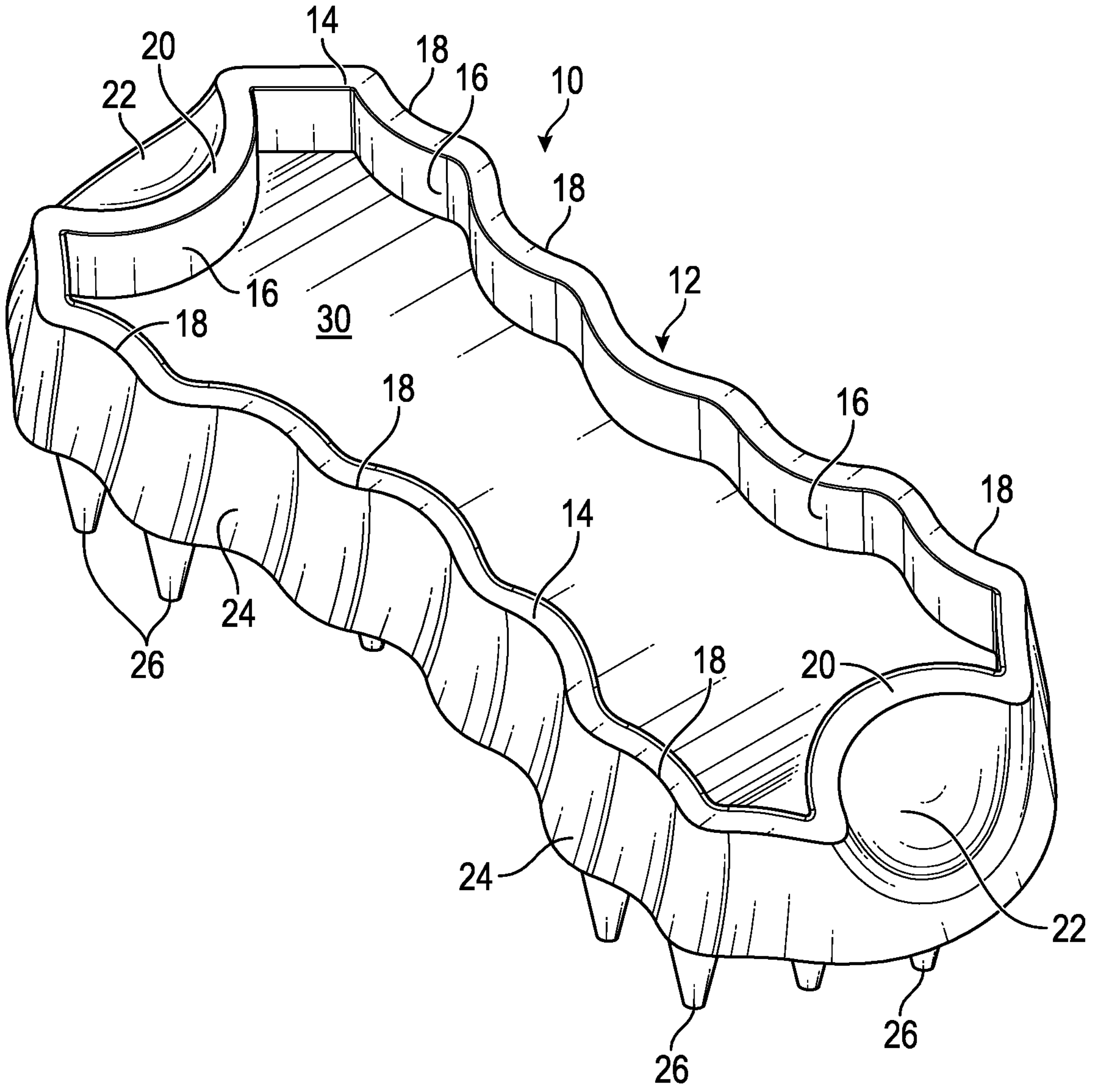
FIG. 1 is a top perspective view of the grooming device of the invention.

FIG. 1 is a top perspective view of the grooming device 10 of the invention according to one preferred embodiment of the invention. Referring also to the top plan view of FIG. 2, the grooming device includes a body 12 that is ergonomically shaped to fit within a user's hand. Conveniently, the body has a group of grooves or indentations 18 that are formed on the outer side edge of the body 12. As shown, there are five indentations 18 that are formed on each outer side edge of the body it being understood however that there can be fewer or a greater number of indentations. When grasping the device, the fingers can be placed on one outer side edge of the body and the thumb can be placed on the opposite side edge. Each end of the device may also include a depression 22 that can be used to assist in gripping the end of the device in which the thumb or fingers may be placed within the depression 22. One should be able to appreciate that based upon the number of indentations 18 and depression 22, the device can be conveniently grasped by the user in various different orientations.

Figure 2:
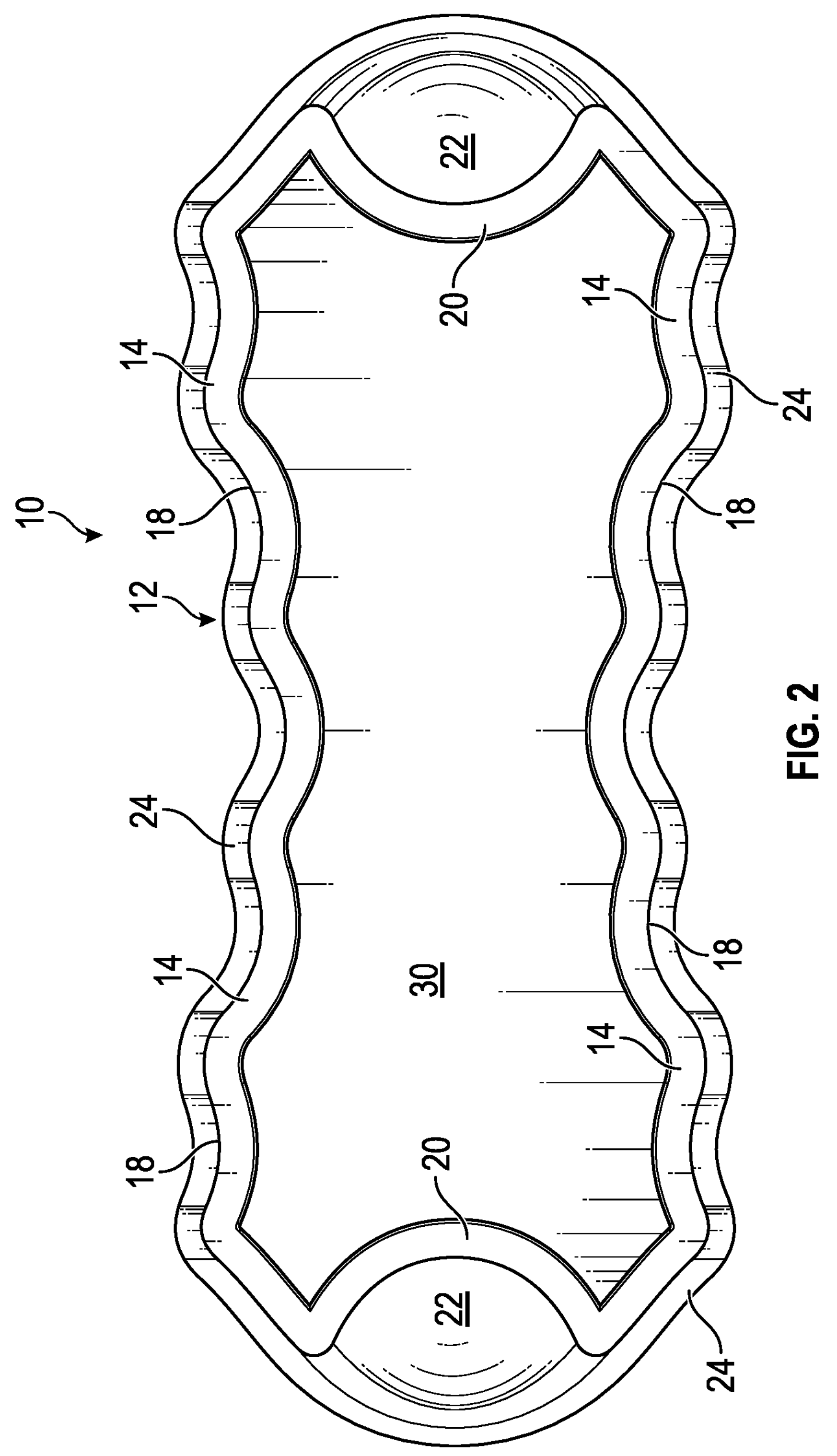
FIG. 2 is a top plan view of the grooming device.
Figure 3:
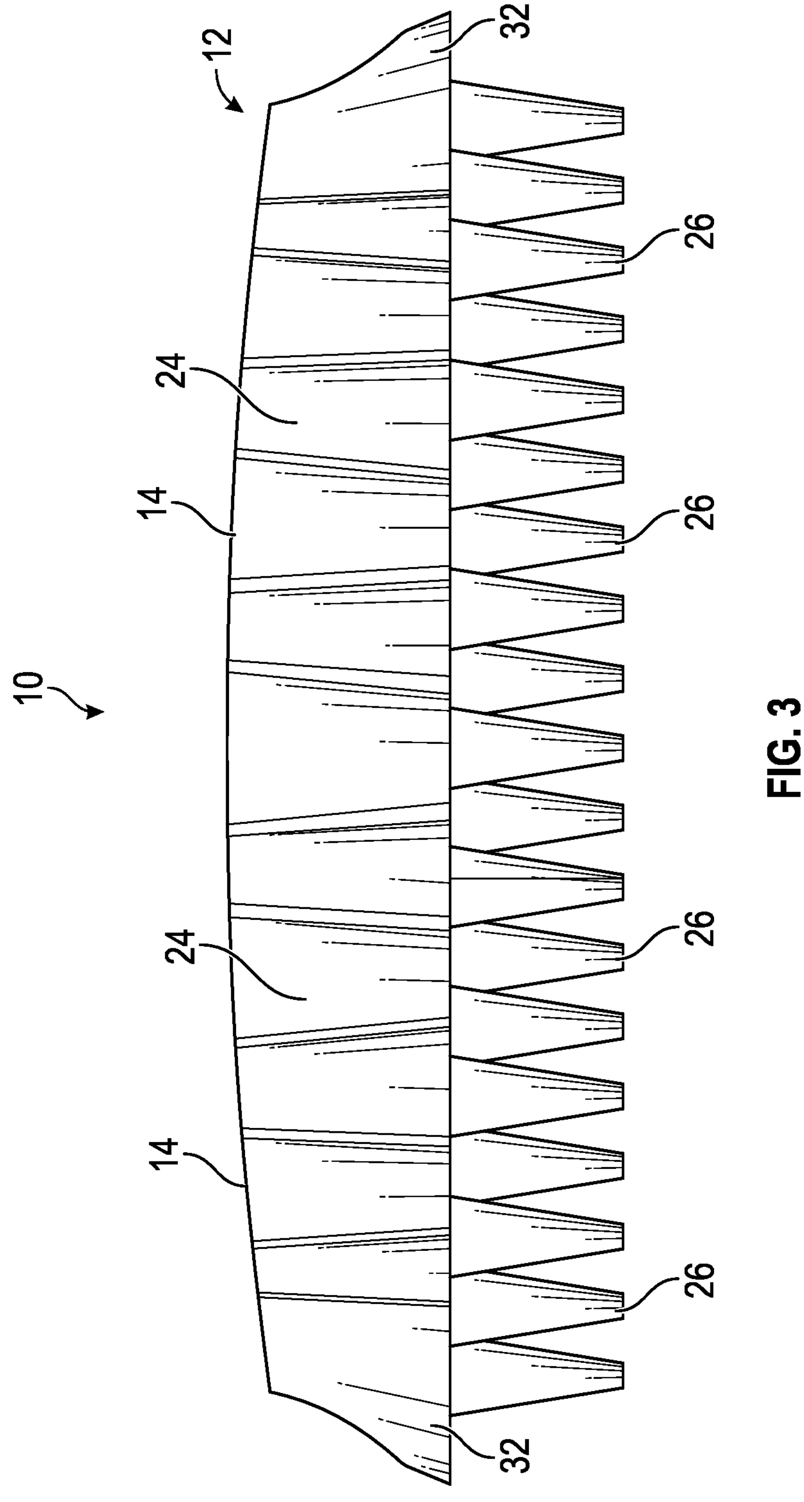
FIG. 3 is side elevation view of the grooming device.
Figures 4, 5:
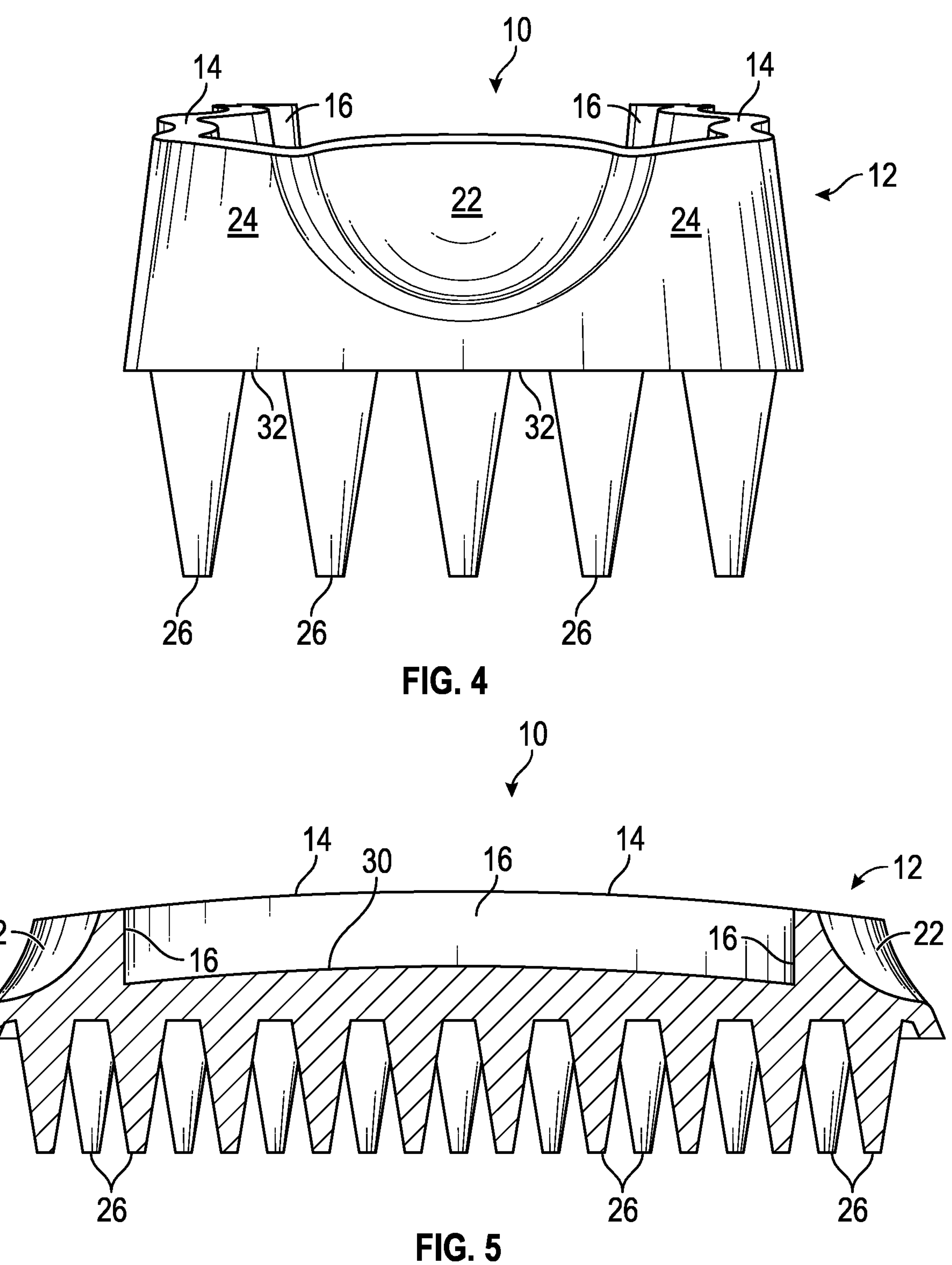
FIG. 4 is an end view of the grooming device.
FIG. 5 is a vertical section of the grooming device.
Figure 6:
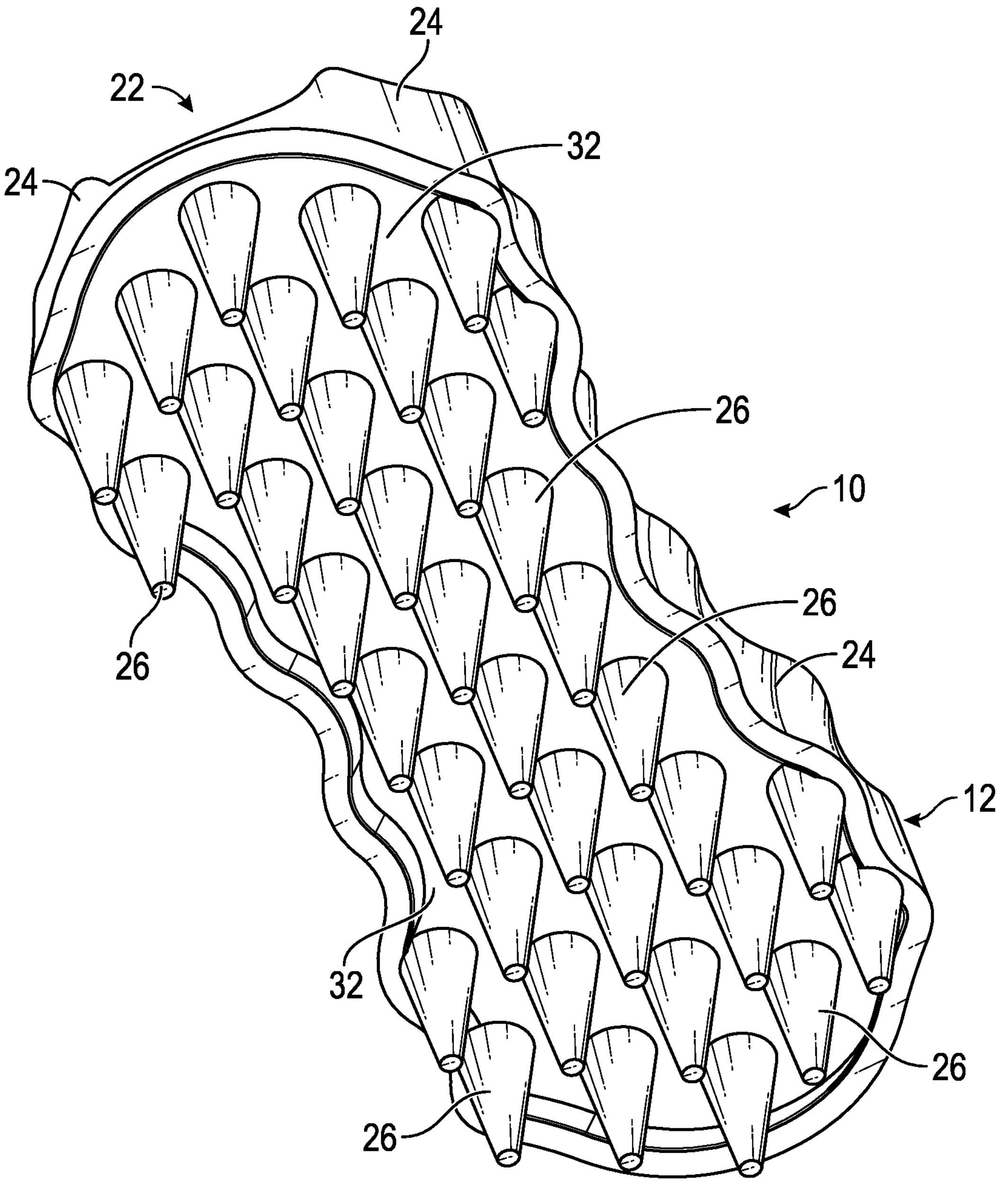
FIG. 6 is a bottom perspective view of the grooming device.

As also shown in FIGS. 1 and 2, the device 10 further includes an upper protruding or peripheral rim or wall 14. The peripheral wall extends continuously with the outer side edge 24 of the body 12 such that the peripheral wall extends above an upper surface 30 of the body. The peripheral wall 14 and the upper surface 30 form a reservoir or enclosure that has multiple functions. In one aspect, the peripheral wall can be considered simply as an extension of the outer side edge 24 such that the indentations 18 are formed continuously along the outer side edge 24 and the peripheral wall 14. The reservoir or enclosure can be defined as the gap or space within the upper surface 30 of the body and the protruding sidewall 16 of the peripheral rim 14.

Referring to FIGS. 3-6, other features of the invention are illustrated to include the grooming elements 26. As illustrated, the grooming elements 26 may have a truncated conical shape in which the larger end of the truncated cone connects to the lower surface 32 of the body. According to one aspect of the invention, the grooming elements can be flexible and elastomeric such that the grooming elements are capable of bending and otherwise deforming when the device is in use as the grooming elements contact the fur and skin of an animal. The grooming elements 26 are illustrated as being evenly spaced from one another along the lower surface 32 of the body. The grooming elements are also illustrated as being of similar sizes and shapes. However, it should be understood that the grooming elements can be irregularly spaced and can be a different sizes and shapes. For example, it may be advantageous to increase the density or number of grooming elements located at the ends of the grooming device in order to facilitate easier scrubbing or washing of smaller surface areas of the animal such as the lower legs and feet. Additionally, the relative stiffness or flexibility of the grooming elements may also differ from one another in order to accommodate a desired scrubbing action when the device is in use.

The device can be made of natural rubber, synthetic rubber, latex, PVC, or other types of thermoplastic materials. One consideration in selecting a material or a combination of materials is that the device should be relatively flexible so that it is easy for a user to grasp the device and to move the device along the curved body of an animal.

Figure 7:
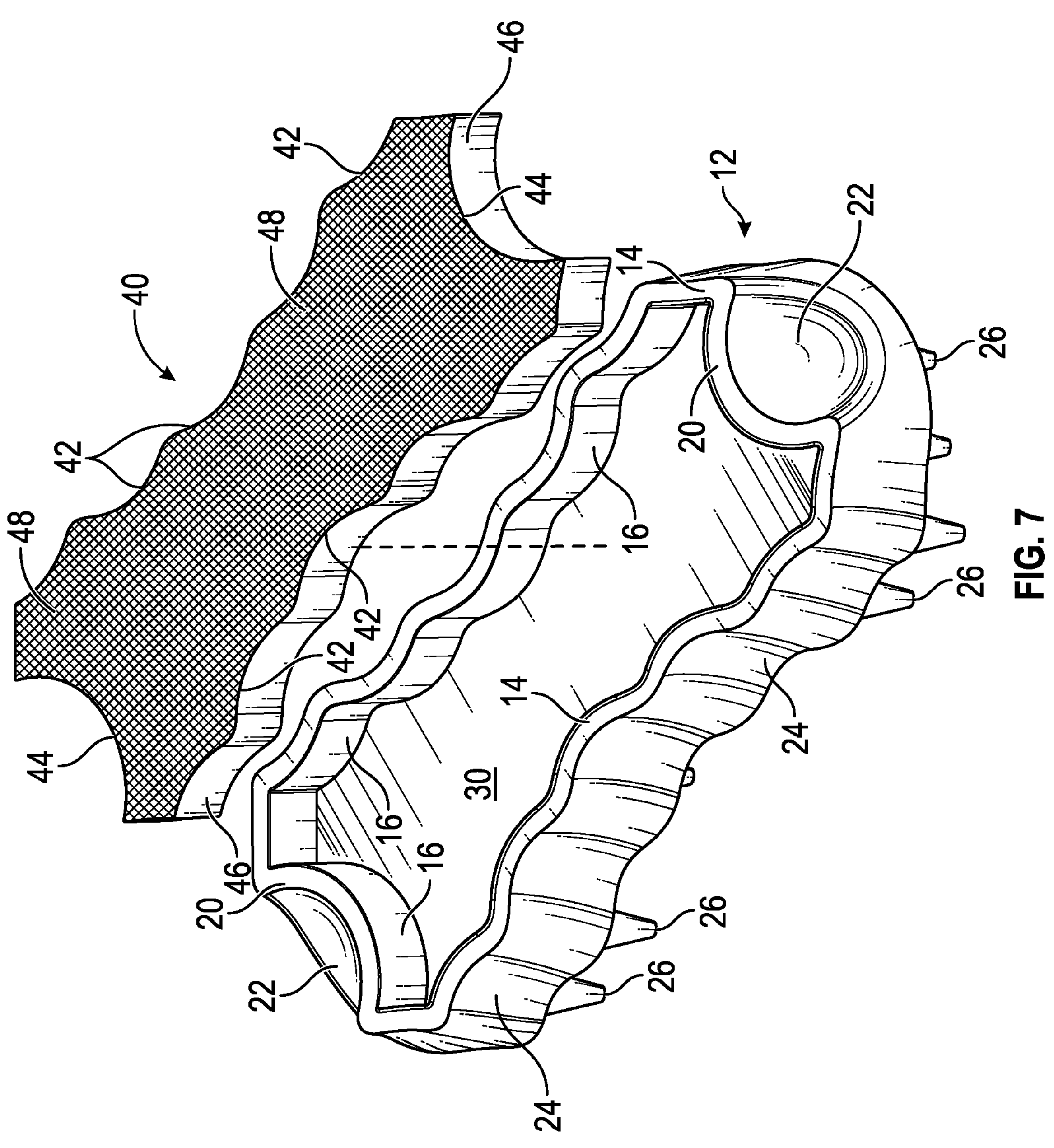
FIG. 7 is a top exploded perspective view of the grooming device of the invention in another embodiment that further includes the first absorbent pad or applicator.

FIG. 7 is a top exploded perspective view of the grooming device of the invention in another embodiment that further includes a first absorbent pad or first applicator 40. The first applicator 40 comprises a body 48 that has a plurality of grooves or indentations 42 that match the configuration of the indentations 18 of the body. The first applicator 40 may have a sidewall thickness 46 that approximately matches the height of the peripheral rim 14 such that an upper surface of the applicator pad 40 is substantially flush with the upper edge of the peripheral rim 14. As also shown, the applicator pad has larger curved indentation 44 in order to also match the configuration of the sidewall 16.

The first applicator 40 is intended to hold a quantity of material such as shampoo, conditioner, medications, pheromones, or other therapeutic materials that are intended to be applied to the fur and skin of the animal. The material can be directly applied to the applicator 40 in which the applicator is preferably made from an absorbent materials such as a sponge. Additionally, the material intended to be applied to the animal can be placed within the reservoir and then the applicator 40 is slowly placed within the reservoir to absorb the material therein.

A user may place the applicator 40 in contact with the fur and skin of the animal to distribute and dispense the material onto the animal. The user may then flip the device over and contact the animal with the grooming elements in order to scrub or otherwise work the material into the fur and skin of the animal. The reservoir can be refilled with the material and/or the material can be directly applied to the applicator pad in order to supply additional material for contacting the animal.

Figure 8:
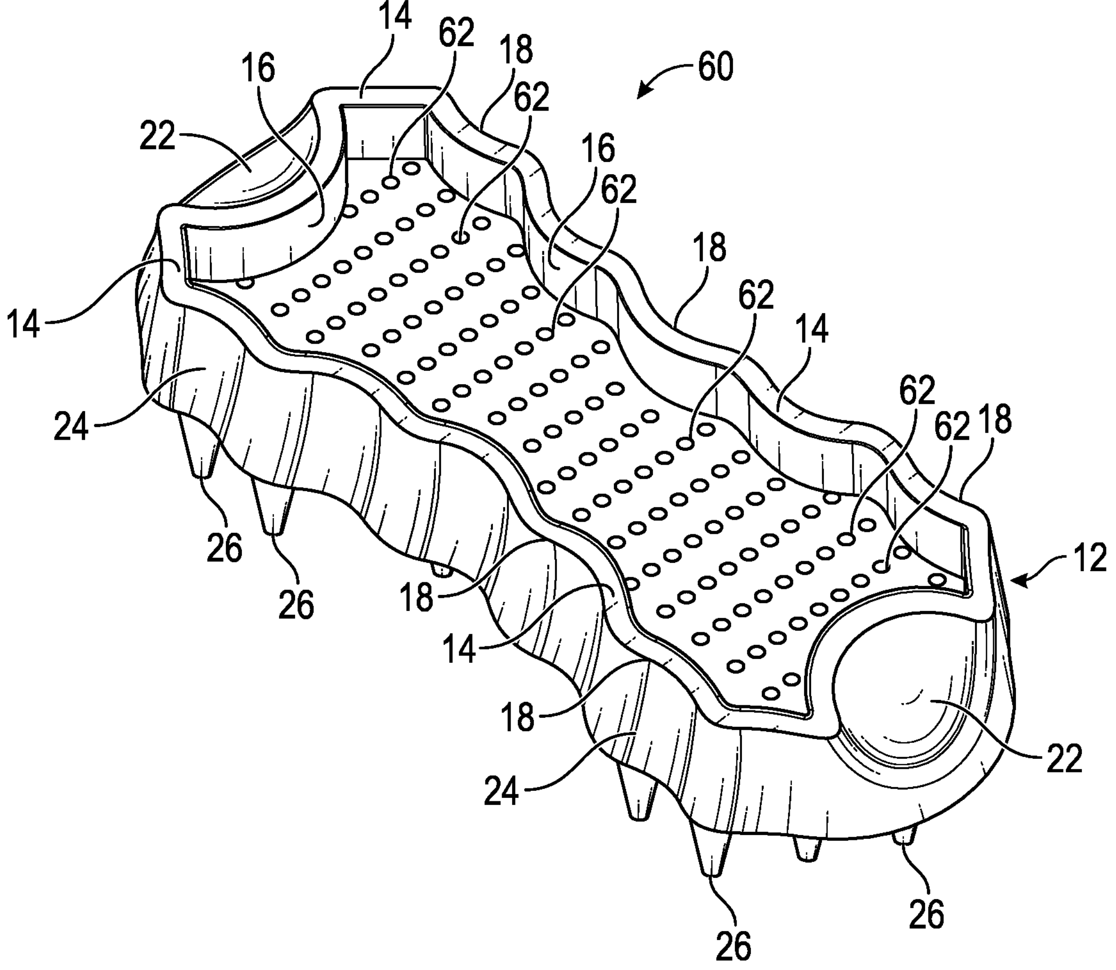
FIG. 8 is a top perspective view of the grooming device of the invention in yet another embodiment that further includes a plurality of dispensing passageways.
Figure 9:
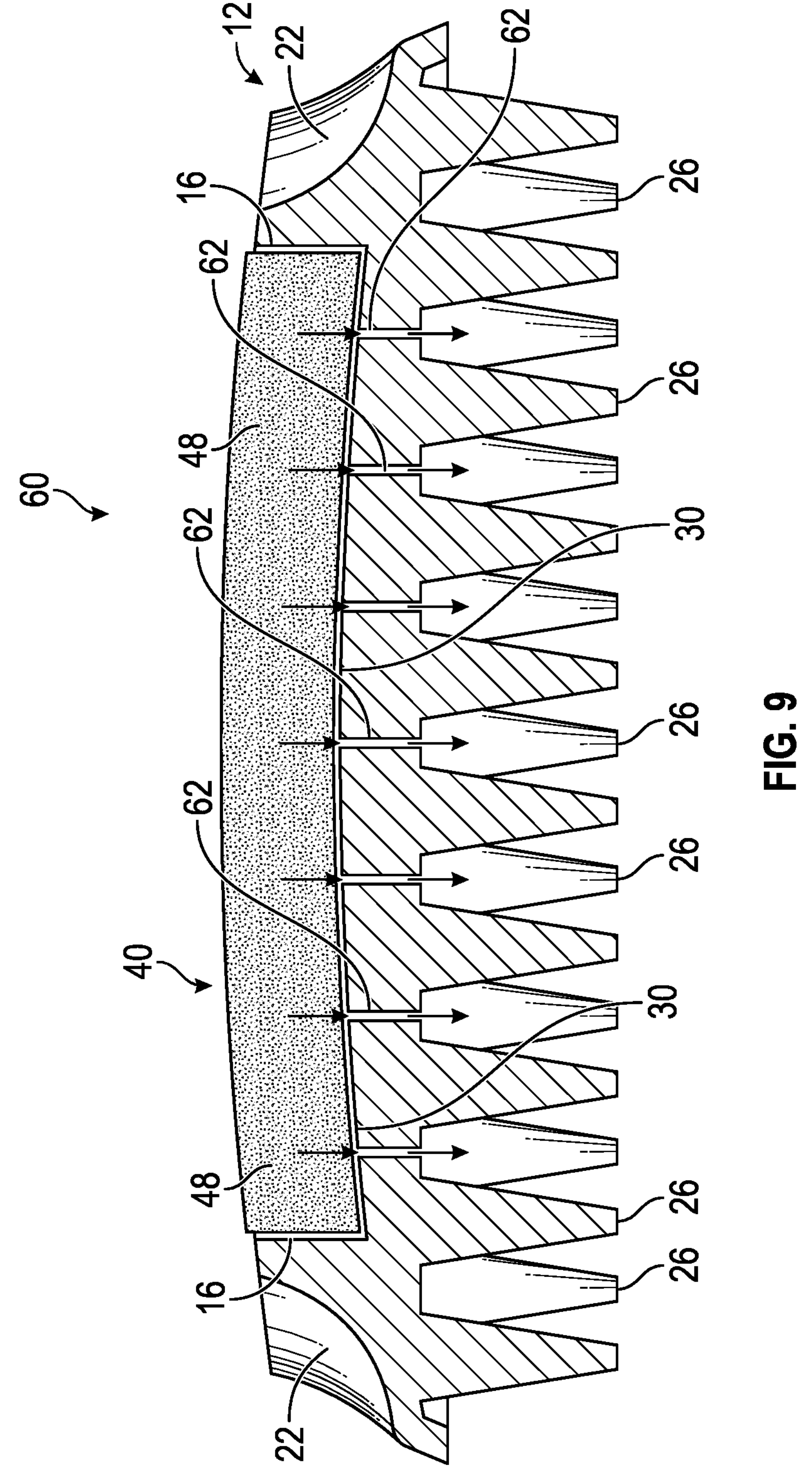
FIG. 9 is a vertical section of the grooming device of FIG. 8 and illustrating the first absorbent pad or applicator installed.

The first applicator 40 may be made of a single material or may have multiple layers. For example, the upper exposed surface of the first applicator 40 may have a roughened texture as compared to the remaining part of the applicator 40 that could be made of an absorbent material such as a sponge. The roughened texture of the upper exposed surface can be used to more aggressively scrub and clean the animal as desired. If the roughened texture is not desired, the user can simply turn the applicator over such that the animal is only exposed to the softer sponge like material Referring to FIG. 8, this figure shows a top perspective view of the grooming device of the invention 60 in yet another embodiment that further includes a plurality of dispensing passageways 62. FIG. 9 is a vertical section of the grooming device of FIG. 8 also illustrating the first absorbent pad or applicator installed. Another way in which therapeutic material can be selectively dispensed onto the animal is by the passageways 62 that extend through the body 12. The plurality of passageways 62 are oriented substantially vertical according to the view in FIG. 9 such that material can easily flow through the passageways 62 to the lower surface 32 of the body and adjacent the points where the grooming elements 26 attached to the body. Directional arrows are provided in FIG. 9 to show how the material can be dispensed from within the applicator 40 and through the passageways 62. The size, distribution, and number of passageways can be adjusted to selectively meter a desired quantity of material within the reservoir and applicator 40.

Figure 10:
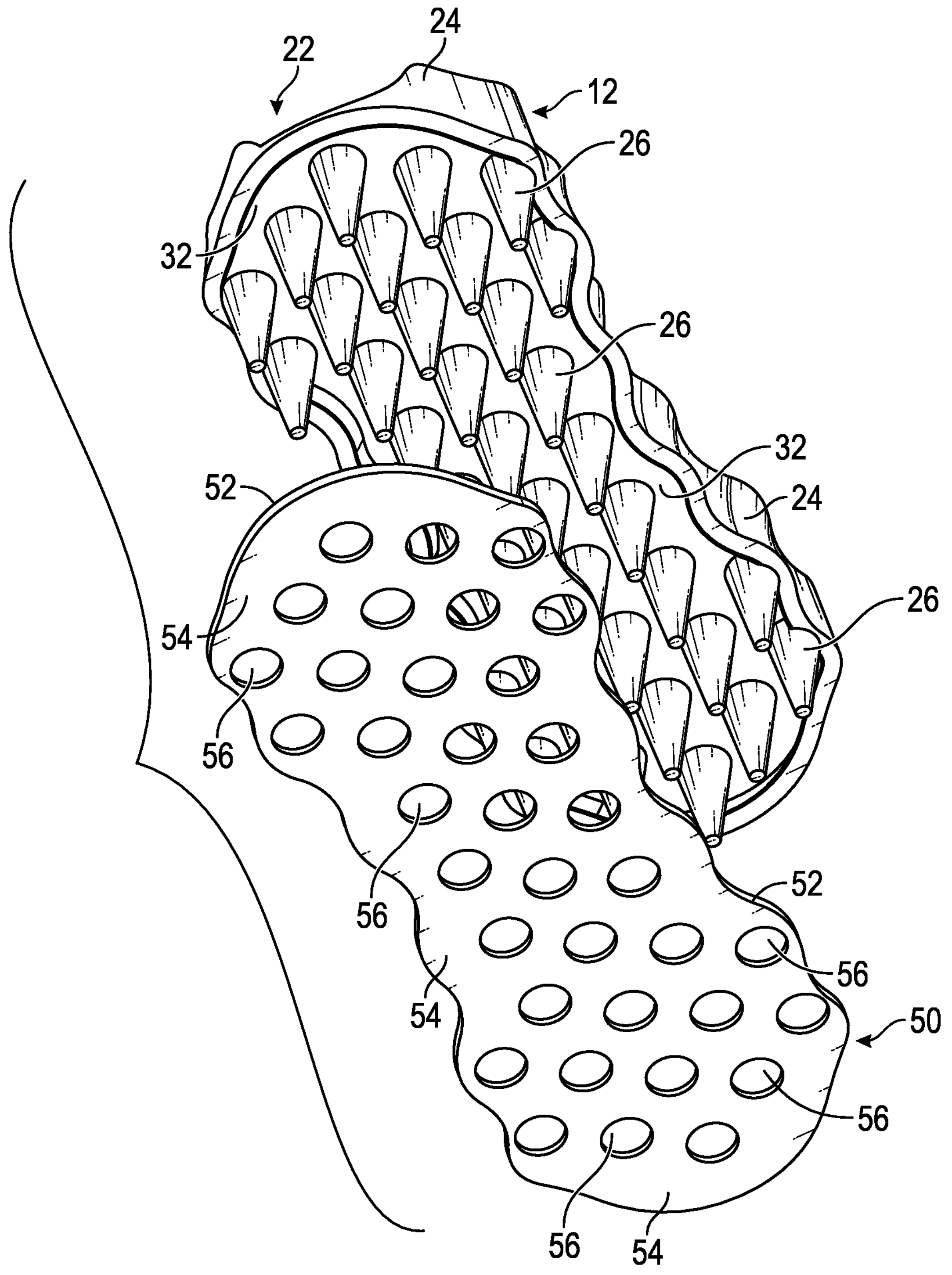
FIG. 10 is a bottom perspective view of the grooming device in yet another embodiment showing the second absorbent pad or applicator.
Figure 11:
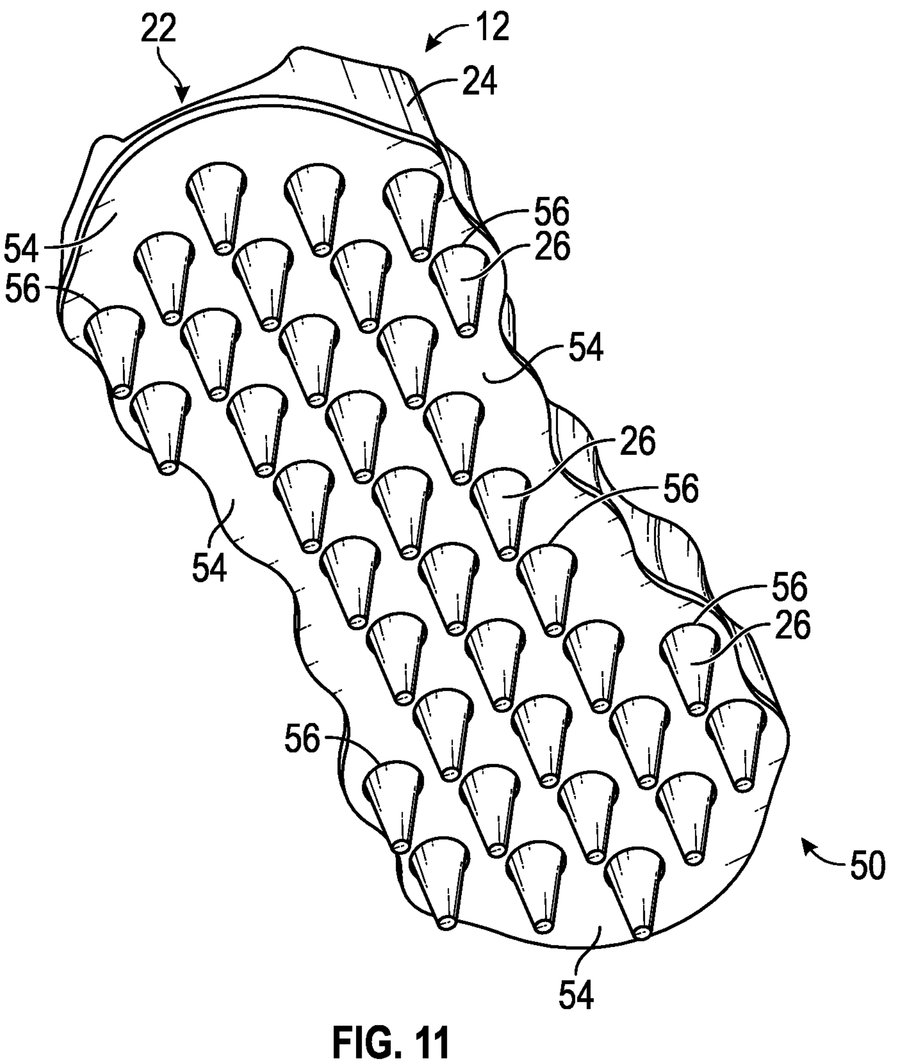
FIG. 11 is a bottom perspective view of the grooming device of FIG. 10 showing the second absorbent pad or applicator installed.

FIG. 10 is a bottom perspective view of the grooming device in yet another embodiment of the invention showing a second absorbent pad or applicator 50. FIG. 11 is a bottom perspective view of the grooming device of FIG. 10 showing the second absorbent pad or applicator 50 installed. The second applicator 50 has a body 54 with a plurality of openings formed therethrough that are sized and configured to receive the grooming elements 26. The second applicator 50 is shown as having a relatively thin sidewall 52 as compared to the thickness of the first applicator 40. According to one configuration, as shown in FIG. 11, the openings 56 can be sized and spaced such that the second applicator 50 can be placed substantially flush against the lower surface 32 of the body. Further, the size of the openings 56 can be made such that there is a frictional fit between the openings and the grooming elements thereby keeping the second applicator 50 secured in place during use. The second applicator 50 has many potential functions. One function could be to apply a finishing therapeutic material after the animal has been shampooed and conditioned, such as applying a pleasant, scented material or pheromone. Another function could be to provide increased retention of material to be applied to the animal which therefore may slow the dispensing of the material onto the animal. For example, if the device to be used includes the passageways 62, the second applicator 50 may be useful in metering the amount of the material being applied by slowing the flow of material through the passageways. The second applicator can also be made of a desired absorbent or semi-absorbent material depending upon how the second applicator is to be used.

Figure 12:
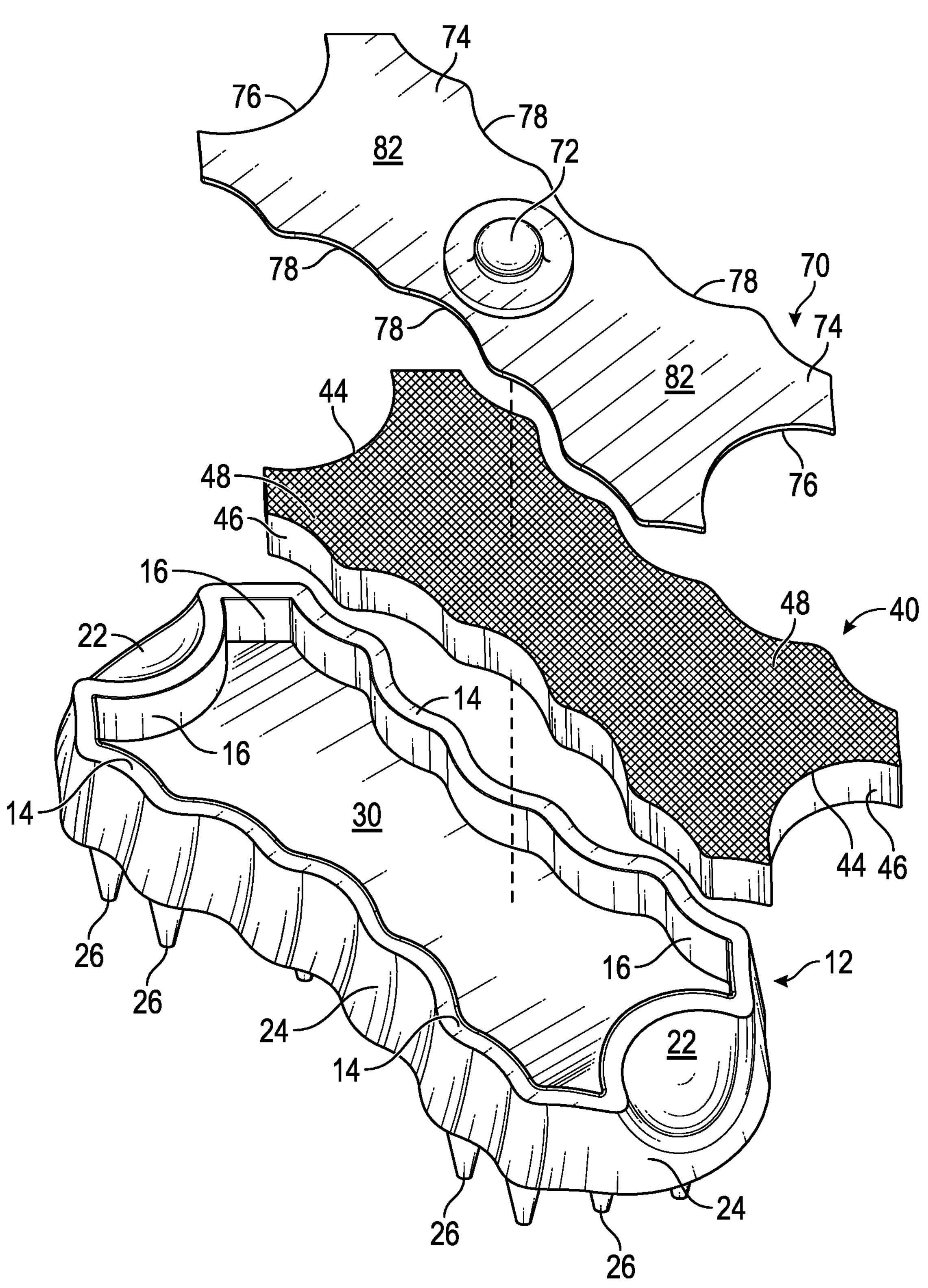
FIG. 12 is a top exploded perspective view of the grooming device of the invention in yet another embodiment that further includes the first absorbent pad or applicator and a pressure cover.
Figure 13:
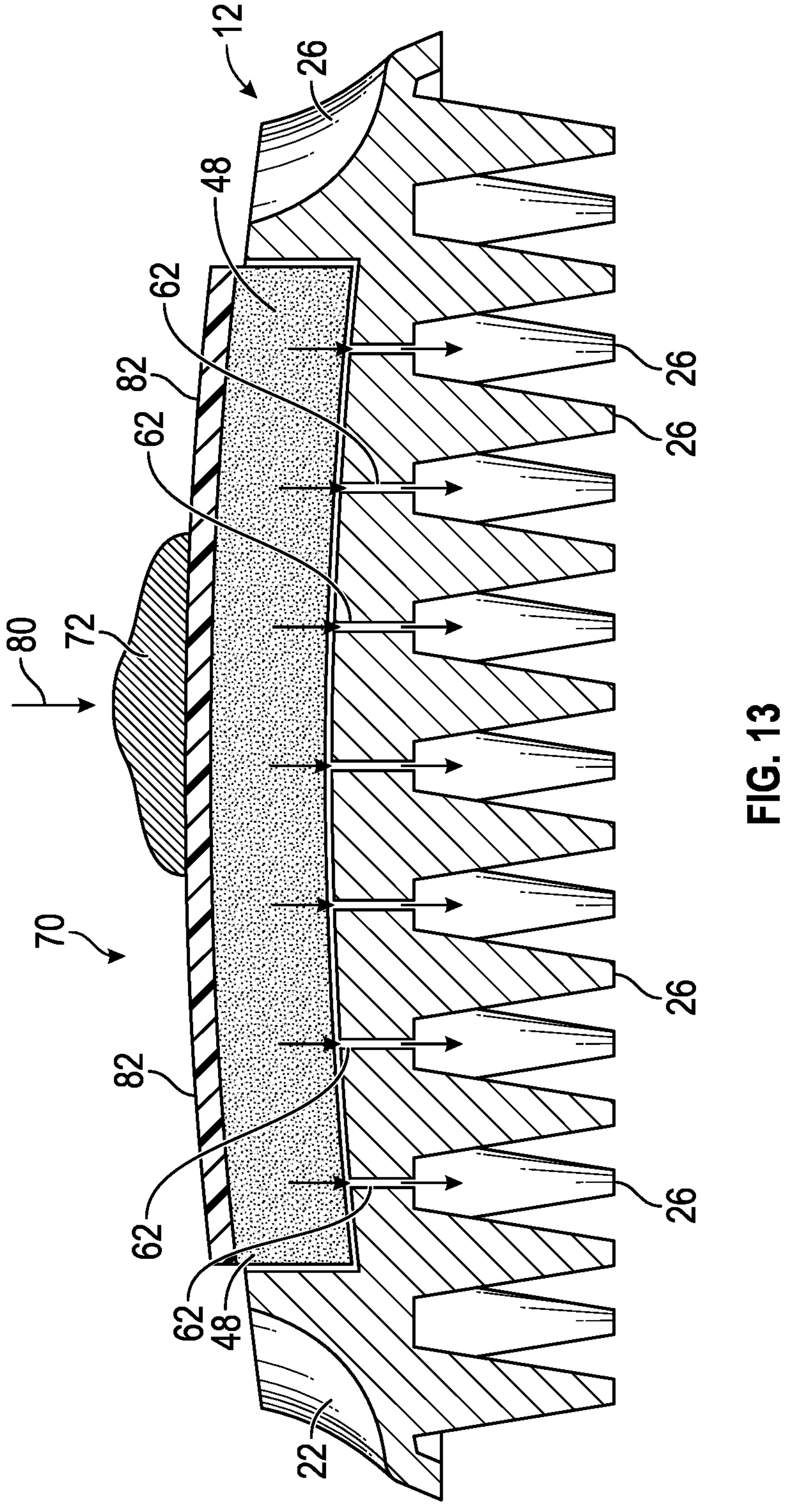
FIG. 13 is a vertical section of the grooming device of FIG. 12 and illustrating the first absorbent pad or applicator and pressure cover installed.

FIG. 12 is a top exploded perspective view of the grooming device of the invention in yet another embodiment that further includes the first absorbent pad or applicator 40 and a pressure cover 70. FIG. 13 is a vertical section of the grooming device of FIG. 12 showing the first absorbent pad or applicator 40 and pressure cover 70 installed. The purpose of the pressure cover 70 is for assisting a user in applying pressure to the first applicator 40 in order to selectively deliver a quantity of the therapeutic material through the passageways 62. The pressure cover 70 has a body 74 and a plurality of indentations 78 that match the configurations of the indentations formed on applicator pad 40 and body 12. A grip point 72 may be added to the exposed surface 82 of the cover 70 so that the user can place the fingers or the palm of the hand against the cover 70 in order to apply pressure to the cover 70

The pressure cover 70 preferably is preferably made of a relatively stiff material such that when a user grasps the grip point 72 and exerts pressure against the cover 70 in the direction of arrow 80, relatively even pressure is transferred across the entire upper surface of the applicator 40 in contact with the pressure cover.

Although the invention herein has been described with respect to various preferred embodiments, it should be understood that the invention is not strictly limited to these embodiments and that the invention should be broadly construed in connection with the appended claims.

What is claimed is:

1. An animal grooming device comprising:

a body;

a plurality of grooming elements secured to a lower surface of the body, said grooming elements having substantially similar shapes and being spaced uniformly from one another along the lower surface;

an upper peripheral rim extending continuously around a periphery of a top side of the body, said upper peripheral rim extending above the top side;

a plurality of indentations formed along an outer side edge of the body;

at least one depression formed on an end of the body; and said top side of the body and said upper peripheral rim form a reservoir for holding a quantity of material therein;

a plurality of passageways formed through said body and not through said grooming elements, said plurality of passageways communicating with said reservoir for selectively dispensing material in said reservoir, wherein the plurality of passageways are oriented such that material flows through the passageways to the lower surface of the body and adjacent to points where the grooming elements attached to the body; and a first applicator pad placed in said reservoir.

2. The animal grooming device of claim 1, wherein:

said grooming elements are conical shaped.

3. The animal grooming device of claim 1, wherein:

said grooming elements have a durometer hardness of between about 40-60 durometer hardness.

4. The animal grooming device of claim 1, wherein:

said at least one depression includes two depression, one depression being located at each opposite end of the body.

5. The animal grooming device of claim 1, wherein:

said grooming device is symmetrical along a longitudinal axis thereof that extends along a length of the body.

6. The animal grooming device of claim 1, wherein:

said grooming device is symmetrical along a transverse axis thereof that extends transversely to a length of the body.

7. The animal grooming device of claim 1, wherein:

said upper peripheral rim has a peripheral plurality of indentations that correspond with and extending uniformly with respect to said plurality of indentations formed on said outer side edge of the body.

8. The animal grooming device of claim 1, wherein:

opposite ends of the body have outwardly curving side edges.

9. The animal grooming device of claim 1, wherein:

said first applicator pad holds a quantity of a material therein for selective dispensing of the material when the device is being used to groom an animal.

10. The animal grooming device of claim 9, wherein:
the material is at least one of shampoo, conditioner, medications, or pheromones.

11. The animal grooming device of claim 1, wherein:
said first applicator pad has a shape that conforms to said reservoir in order to frictionally retain said applicator within said reservoir.

12. The animal grooming device of claim 1, wherein:
said first applicator pad has a single layer.

13. The animal grooming device of claim 1, wherein:
said first applicator pad has at least two layers.

14. The animal grooming device of claim 13, wherein:
a second layer of said first applicator pad has a rougher texture than said first layer.

15. The animal grooming device of claim 1 wherein:
said plurality of passageways are openings that have substantially similar sizes and are substantially evenly distributed and spaced from one another on said body.

16. The animal grooming device of claim 1, further including:
a second applicator pad releasably secured adjacent to or against the lower surface of said body, said second applicator pad having a plurality of openings to receive the grooming elements such that said second applicator pad is frictionally held in place by the openings being in contact with said grooming elements.

17. The animal grooming device of claim 1, further including:
a pressure cover placed over said first applicator pad wherein pressure applied to the pressure cover causes dispensing of the material from said first applicator pad.

18. The animal grooming device of claim 1, wherein:
said first applicator pad has a lower surface mounted over said top side of said body.

19. An animal grooming device comprising:
a body;
a plurality of grooming elements secured to a lower surface the body, said grooming elements having substantially similar shapes and being spaced uniformly from one another along the lower surface bottom side;
an upper peripheral rim extending continuously around a periphery of a top side of the body, said upper peripheral rim extending above the top side;
said top side of the body and said upper peripheral rim forming a reservoir;
a first applicator pad placed within said reservoir that holds a quantity of material therein;
a plurality of passageways formed through said body and not through said grooming elements, said plurality of passageways communicating with said reservoir for selectively dispensing material in said reservoir or said first applicator pad, wherein the plurality of passageways are oriented such that material flows through the passageways to the lower surface of the body and adjacent to points where the grooming elements attached to the body; and
a pressure cover placed over said first applicator pad wherein pressure applied to the pressure cover causes dispensing of the material from said first applicator pad.

20. The animal grooming device of claim 19, wherein:
the material is at least one of shampoo, conditioner, medications, or pheromones.

21. The animal grooming device of claim 19, further including:
a second applicator pad releasably secured adjacent to or against the lower surface of said body, said second applicator pad having a plurality of openings to receive the grooming elements such that said second applicator pad is frictionally held in place by the openings being in contact with said grooming elements.

22. The animal grooming device of claim 19, wherein:
said first applicator pad has a lower surface mounted over said top side of said body.

23. An animal grooming device comprising:
a body;
a plurality of grooming elements secured to a lower surface of the body, said grooming elements having substantially similar shapes and being spaced uniformly from one another along the lower surface;
an upper peripheral rim extending continuously around a periphery of a top side of the body, said upper peripheral rim extending above the top side;
said top side of the body and said upper peripheral rim form a reservoir for holding a quantity of material therein; and
a plurality of passageways formed through said body for selectively dispensing material from said reservoir through the lower surface wherein the plurality of passageways are oriented such that material flows through the passageways that terminate through the lower surface of the body adjacent to points where the grooming elements attached to the body.

* * * * *